April 12, 1960     L. KNIGHT ET AL     2,932,450
ELECTRONIC CALCULATING APPARATUS
Filed Aug. 11, 1955     6 Sheets-Sheet 1

FIG. 1.

INVENTORS
LORIN KNIGHT
ALEC TRUSSELL
BY Frederick E. Hane
ATTORNEY

FIG. 2.

INVENTORS
LORIN KNIGHT
ALEC TRUSSELL

INVENTORS
LORIN KNIGHT
ALEC TRUSSELL
BY
ATTORNEY

United States Patent Office 2,932,450
Patented Apr. 12, 1960

2,932,450
ELECTRONIC CALCULATING APPARATUS

Lorin Knight and Alec Trussell, Letchworth, England, assignors to International Computers and Tabulators Limited, London, England Application August 11, 1955, Serial No. 527,738

8 Claims. (Cl. 235—159)

This invention relates to cyclically operable electronic calculating apparatus.

The object of the invention is to provide improved electronic calculating apparatus, which performs division of decimal values by repeated subtraction and column shifting.

According to the invention cyclically operable electronic calculating apparatus has means for repeatedly subtracting a divisor value from a first remainder value until the difference becomes negative, means for detecting said negative sign, means controlled by the sign detection means for preventing further subtraction and for reading out a quotient digit, means for adding the divisor to said negative difference, means for multiplying the sum by ten to form a second remainder value, the formation of the second remainder value from the first value comprising a major cycle, and control means for effecting a predetermined number of major cycles, the first remainder value of one cycle being formed by the replacement of the least significant digit of the second remainder value of the previous cycle by a dividend digit, the dividend digits being taken in sequence, one for each cycle, commencing with the most significant digit. In the first cycle, the first remainder value is formed from a second remainder value of zero. The apparatus may include means for storing divisor, dividend, quotient and remainder values, quotient digits being entered into the quotient store under control of the sign detection means, and means for reading out dividend digits from the dividend store, one on each cycle, in order of decreasing significance.

The invention will now be described, by way of example, with reference to the accompanying drawings, in which.

An electronic calculator for performing addition, subtraction and multiplication is described in United States patent application Ser. No. 427,907, filed May 6, 1954, assigned to the same assignee as the present case. The machine of the present invention is similar in many respects to the calculator described in this reference application, and the common features of the two machines will be described in detail herein only to the extent which is necessary for an understanding of the present invention.

The machine described in the reference application has an arithmetic unit, which consists basically of three stores and an adding unit. The stores are of the type which employ triggers coupled together to form a shifting register. Each store comprises four shifting registers. Each digit of a number is represented in a four component code i.e. in binary coded decimal, the components having the values 1, 2, 4 and 8 respectively. Each shifting register stores one code component of all the digits of a number.

By suitably energising input and output gates associated with each store, a number may be fed to the adding unit from any of the stores, or entered into any of the stores from the adding unit. Each time a shift pulse is applied to a store, a single digit, in coded form, is fed to the adding unit from the store, or is accepted by the store. Thus, two numbers are added, for example, digit by digit, commencing with the least significant, and the sum is entered into a store in the same way.

The arithmetic unit of the present machine is similar to that of the machine of the reference application, except that one of the stores is provided with means for entering quotient digits therein.

The sequencing of arithmetic operations is determined by a control unit. The structure and operation of this control unit is fully described in the reference application. This unit includes a master pulse source which drives a primary timer, which comprises a shifting register. The primary timer produces control pulses and control voltages for the arithmetic unit, such that one cycle of the primary timer may be used to effect a simple operation, such as the addition of two numbers, or the transfer of a number from one store to another. One cycle of the primary timer will be referred to as a minor cycle of the calculator.

The control unit also includes a programme timer, which comprises a shifting register which receives a shift pulse each time an operation is completed. By making plug connections from the individual stages of the programme timer to a function matrix, the required control voltages are produced to enable any desired sequence of operations to be performed. A multiplier cycle counter controls the number of minor cycles utilised during a multiplication, so that this operation is controlled by a single programme step. There are also facilities for column shifting, that is, dividing by ten, a number which is held in one of the stores.

The control unit of the present machine has all the above-mentioned features, and also has additional control circuits which are used solely for sequencing division operations.

The division operation is made up of a group of major cycles, one major cycle for each quotient digit. Each major cycle consists of eleven minor cycles. During ten of these minor cycles, the divisor may be subtracted from the dividend. When the difference becomes negative, the cycling continues, although the actual subtraction of the divisor is suppressed. Thus the divisor is subtracted a number of times equal to the quotient digit plus one. On the last minor cycle the divisor is added to the negative difference to correct for the over-subtraction, and the remaining digits of the dividend and this new remainder are column shifted relative to the divisor. This shifting of the dividend value positions the next dividend digit for reading out on the following cycle.

A four stage decimal counter has the count increased by one for each minor cycle, except the first. When the remainder changes sign, the value standing in the counter is read out as the quotient digit. The stages of the counter are interconnected by gates in such a way that the last pulse of each major cycle operates both the first and the fourth stages of the counter which has the effect of resetting the counter to register zero.

The number of major cycles is controlled by a second counter which is manually plugged to provide the required number of quotient digits, in the same way as that in which cycling is controlled by the multiplication cycle counter.

Figure 1:
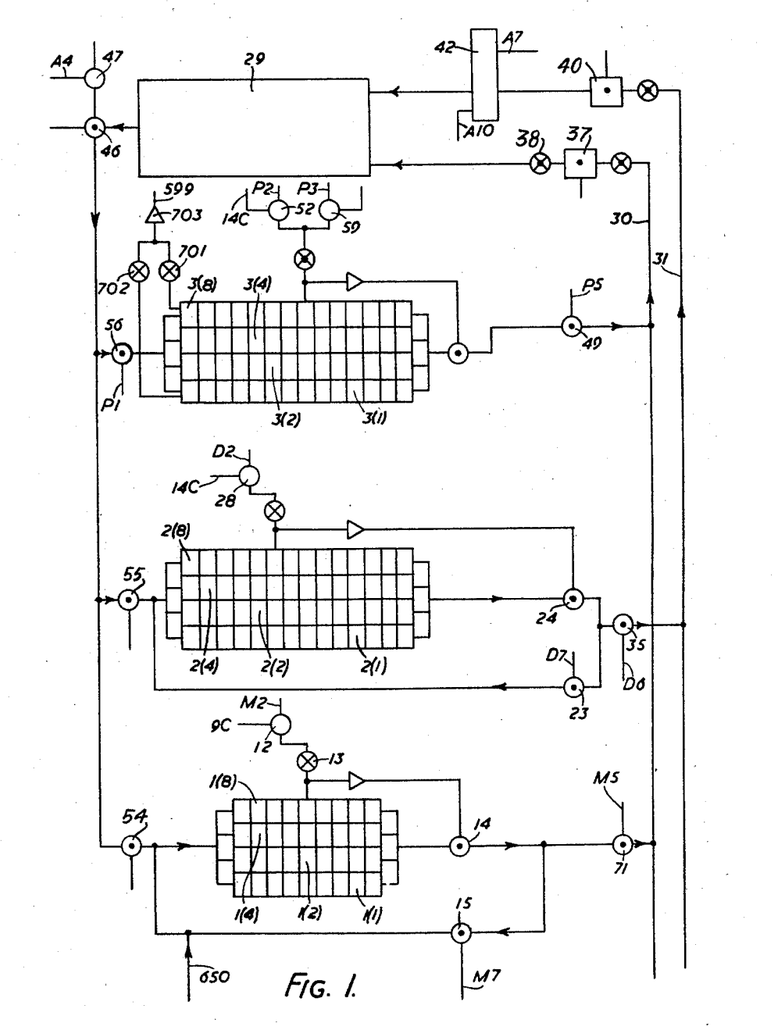
Figure 1 is a block diagram of the arithmetic unit of the calculator.

The divisor and dividend values are entered into two stores in the same manner as that described in the reference application. The dividend is entered into a store 1 (Figure 1 through associated input gates 54). This consists of four shifting registers corresponding to the four components 1, 2, 4, 8 of the code. These registers are given suffixed references, such as 1(4) for the register of the store 1 which stores the code component four of the dividend.

The shifting registers are of known type, comprising a trigger circuit for each stage, with diode coupling between each stage and the next, to allow the setting to be moved along the register under control of shifting pulses. The presence of a code component is represented by the corresponding trigger circuit being "on."

For convenience those parts which have a similar function are given the same reference numbers as corresponding parts in the reference patent.

The divisor is entered into a similar store 2 through associated input gates 55, and when the entry is complete the extreme right hand stages of each store register the least significant digit. Thus if the dividend is 76295, the settings of the individual triggers will be as shown below, "X" indicating that a trigger is "on" and "–" indicating that it is "off."

```
                 0 0 0 0 7 6 2 9 5
Register 1(1)    - - - - X - - X X
Register 1(2)    - - - - X X X - -
Register 1(4)    - - - - X X - - X
Register 1(8)    - - - - - - - X -
```

Shift pulses applied to the registers move the settings of the triggers one place to the right each time. For reasons which will be explained hereinafter, it is necessary to shift the dividend through the register until the most significant figure is at the extreme right hand end, with the remaining digits at the left hand end of the register, so that settings of the triggers will represent the number 629500007.

The output of the store 1 is controlled by four gates 14. For the sake of clarity the gates 14 are represented by a single symbol and the connections by a single line. A dot placed inside a symbol indicates that that symbol represents four similar units corresponding to the four code components.

Single valve gates such as the gates 14 are operated by two positive inputs, one input being a positive pulse, and the other a positive control voltage which remains at a fixed value for a time which is long compared with the duration of the pulses. When both inputs are present, the gate produces a negative output pulse, which may be inverted, if necessary, by a pulse transformer.

Each control voltage may assume either a high level or a low level. These levels are at different voltages in relation to the earth line according to whether the control voltage is supplied by a trigger, an inverter or a cathode follower. However, for convenience, the high and low levels will be referred to as positive and negative voltages, irrespective of their actual value in relation to earth.

The dividend having been read from a punched card and entered into the store 1, the first step is to shift the dividend to the correct position in the store.

Operation of the calculator is controlled in conventional manner by a programme timer of well known form. Such a programme timer responds to successive shift pulses to render positive the output voltage from successive ones of a plurality of programme step sockets. The shift pulses are provided by the switching off of a trigger, usually referred to as the operation complete trigger, to which an operation complete pulse from the calculator control circuits is applied at the end of each programme step and to which an operation start pulse is applied at the beginning of a programme step. The construction and operation of this programme timer and its controlling trigger are well-known and are not described in detail herein. A programme timer of this kind is described in an article "A Commercial Electronic Calculator," by W. Woods-Hill, published in Electronic Engineering, vol. 27, No. 330, pp. 332–337.

A socket 603 (Figure 2) is connected to one of the programme step sockets of the programme timer and upon completion of a previous programme step an operation complete pulse switches off the operation complete trigger to apply a shift pulse to the programme timer and thus render positive the output voltage from the step socket connected to socket 603. This voltage is fed to a gate 604 via a cathode follower 606. The operation complete trigger is then switched on by an operation start pulse and in switching on produces a pulse which is fed to gate 604 over line 190.

Each minor cycle of machine operation is defined by a group of sixteen evenly spaced pulses derived from a primary timer which serves to distribute clock pulses to a plurality of lines connected thereto and conveying individual clock pulses or groups of clock pulses to various points in the control circuit and arithmetic unit as will become apparent as the description proceeds. The individual pulses are referred to as TX, and T1 to T15 pulses respectively in order of occurrence and the lines conveying groups of pulses each have the reference C preceded by the number of clock pulses per minor cycle conveyed by that line. Thus line 9C conveys nine clock pulses per minor cycle and line 14C conveys fourteen pulses. The T15 pulse of the last minor cycle of a programme step constitutes the operation complete pulse for switching off the operation complete trigger and the TX pulse of a succeeding minor cycle constitutes the operation start pulse which switches such trigger back on again.

Figure 2:
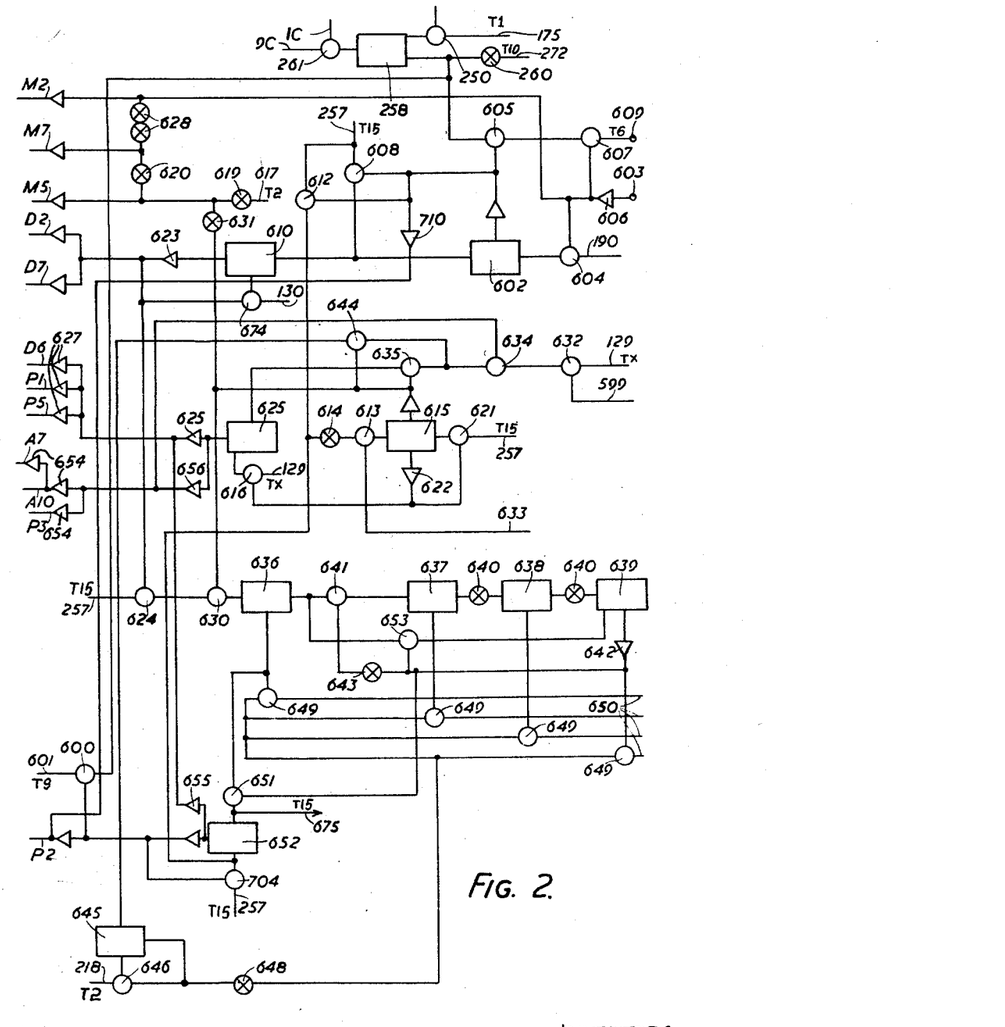
Figure 2 is a block diagram of part of the control unit of the calculator.

Since gate 604 is open, by virtue of the positive voltage connected to socket 603 by the programme timer, when the switching pulse is applied to it over line 190 this pulse passes through gate 604 to set a trigger 602. The high anode of the trigger 602 controls a gate 605, through a cathode follower.

The cathode follower 606 also controls a gate 607. The pulse input to the gate 607 is derived from a plug socket 609 which is connected to one of a group of sockets providing pulse outputs from the various stages of the primary timer.

The shift pulses for the store 1 are controlled by a trigger 258. When this trigger is "on," a gate 261, which it controls, passes clock pulses on a line C1 to a line 9C. The pulses on the line 9C are fed in common to all the stages of the store by a gate 12 (Figure 1) and an inverter 13. The gate 12 is also controlled by the voltage on a line M2, which is one of the output lines of the function matrix.

The trigger 258 is switched "on" during each minor cycle by a T1 pulse, which is applied to it via line 175 and a gate 250. The gate 250 is provided to allow suppression of this T1 pulse if the operation for a particular programme step is to be cancelled; this is a feature which is not relevant to the description of division.

The trigger 258 is normally switched "off" by a T10 pulse fed to it via a line 272 and an inverter 260. Thus the gate 261 will provide nine pulses on the line 9C for each minor cycle. However, if the socket 609 receives a positive pulse and the trigger 602 is "on," then the gate 605 will be operative, and a pulse will be fed to the trigger 258 to switch it "off" before the T10 pulse occurs.

The maximum number of digits in the dividend is fixed by the number of columns of the card allocated to recording it. Normally the dividend will be entered in the store 1 so that the least significant digit is at the extreme right hand end of the store. In order to leave the most significant digit at the right hand end of the store, the dividend must be shifted one position less than the maximum number of digits. The store 1 is so connected that a shifted value is re-circulated. Thus, after the first shift pulse, the least significant digit will have been shifted from the right hand to the left hand end of the store and the remaining digits will have been shifted one place to the right. After the second shift pulse the two least significant of the dividend digits will occupy two places at the left hand end of the store. It will be apparent that a number of shift pulses equal to one less than the number of dividend digits will shift all the dividend digits through into the left hand end of the store and the most significant dividend digit will be left occupying the extreme right hand end of the store. For example, if the dividend does not exceed six digits, then five shift pulses are applied to the store 1. For this the socket 609 is plugged to receive a T6 pulse, so that the trigger 258 is switched "off" at this time, and only five pulses are fed to the line 9C.

The shift pulses for the store 1 are also applied to four gates 14, so that the digit at the right hand end is read out each time a shift occurs. The output pulses are fed to four more gates 15, the output of which is fed back to the input of the store. The gates 15 are controlled by the voltage on a line M7, so that if lines M2 and M7 are both positive, then shift pulses will produce circulation of the dividend in the store. The cathode follower 606 (Figure 2) holds the line M2 positive via a further cathode follower, and it holds the line M7 positive via two cascaded inverters 628 and a further cathode follower. Thus during the first minor cycle of the programme step the dividend is shifted to the correct position relative to the divisor.

The trigger 602 also makes a control line P2 positive, via a cathode follower 710. The line P2 controls a gate 52 (Figure 1) to allow fourteen shift pulses to be fed to store 3 from a line 14C. The other gates associated with the store 3 are closed at this time, so that this clears the store.

The circuit is now conditioned to perform as many major cycles as there are to be digits in the quotient. A T15 pulse is fed to a gate 608 by a line 257. This gate is held open by the trigger 602 being "on." The output pulse from the gate 608 switches "off" the trigger 602, and switches "on" a divide trigger 610, which remains "on" until the division operation is completed.

On the first minor cycle of each major cycle, the digit of the dividend which is held in the four trigger circuits forming the extreme right in or last stage of the store 1 is read out to an adding unit 29 (Figure 1). The divisor is also read out to the adding unit 29, through a circuit 42 which converts it to complemental form. The difference resulting from the subtraction of the divisor from the dividend digit or digits is entered into a store 3.

At the end of each major cycle, the remainder in the store 3 is column shifted up one position. Consequently the last digit of the remainder, at the beginning of a major cycle is always zero. On the first major cycle, all the remainder digits will be zero. At the same time, the dividend is shifted to bring the highest remaining digit into the last stage of the store 1.

On each subtraction cycle the remainder in the store 3 is read out to the adding unit, so that on the first minor cycle of each major cycle, it is added to the dividend digit read out from the store 1. As already noted, subtraction is suppressed as soon as the remainder goes negative.

The store 1 is used to hold the quotient as it is built up digit by digit the number of stages of store 1 required to store the dividend being reduced by one for each major cycle.

The operation is illustrated by the following table which shows the values standing in the stores at the end of the minor cycles listed in the second column of the table, when the number 1714 is divided by 9. At the beginning of the operation, i.e. before the initial positioning of the dividend, store 1 contains 000—1714 and store 2 contains 0000—09".

| Major Cycle | Minor Cycle | Store 1 Dividend/ Quotient | Store 3 Remainder | Store 2 Divisor | Operation |
|---|---|---|---|---|---|
| -- | 1 | 7140—01 | 00—00 | 00—09 | Initial dividend shift. |
| 1 | 1 | 7140—00 | 99—92 | ------ | Read out dividend digit and remainder and subtract divisor and suppress subtraction. |
| -- | 11 | 1400—07 | 00—10 | ------ | Add divisor, column shift remainder and dividend. |
| 2 | 1 | 1400—00 | 00—08 | ------ | As major cycle 1 without suppression of subtraction. |
| -- | 2 | 1400—00 | 99—99 | ------ | Subtract divisor and suppress further subtraction. |
| -- | 3 | 1400—01 | ------ | ------ | Enter quotient digit. |
| -- | 11 | 400—11 | 00—80 | ------ | As major cycle 1. |
| 3 | 1 | 400—10 | 00—72 | ------ | As major cycle 2. |
| -- | 2 | -------- | 00—63 | ------ | As major cycle 2, minor cycle 1. |
| -- | 3 | -------- | 00—54 | ------ | As major cycle 2. |
| -- | 4 | -------- | 00—45 | ------ | Do. |
| -- | 5 | -------- | 00—36 | ------ | Do. |
| -- | 6 | -------- | 00—27 | ------ | Do. |
| -- | 7 | -------- | 00—18 | ------ | Do. |
| -- | 8 | -------- | 00—09 | ------ | Do. |
| -- | 9 | -------- | 00—00 | ------ | Do. |
| -- | 10 | -------- | 99—91 | ------ | As major cycle 2, minor cycle 2. |
| -- | 11 | 00—194 | 00—00 | ------ | As major cycle 1 and enter quotient digit. |
| 4 | 1 | 00—190 | 99—95 | ------ | As major cycle 1. |
| -- | 11 | 00—1900 | 00—40 | ------ | Do. |

At the end of the fourth major cycle, the result of the division is held as a quotient of 190 and a remainder of four. If more significant figures are required in the quotient, then the division is carried on for more major cycles.

Since the quotient is effectively shifted one position to the left for each major cycle, the position of the decimal point in relation to the last stage of the store 1 is dependent on the number of cycles. The number of quotient digits in the store to the right of the decimal point is found by subtracting the number of dividend digits from the number of major cycles increased by one, and adding the difference between the number of decimal places in the dividend and divisor. This assumes that the dividend and divisor are entered initially with the least significant digit in the right hand stage of the respective stores.

Taking the above example, the position of the decimal point after three major cycles will be given by $3+1-4=0$, that is, the decimal point occurs to the right of the last digit position in the store 1. Hence the quotient is 190, the digit in the last stage being ignored since it is not part of the quotient.

If the problem had been dividing 17.14 by 0.9, then after four major cycles, the position of the decimal point would have been given by $4+1-4+2-1=2$, that is, the quotient would have been 19.0.

The T15 pulse which switches the divide trigger 610 "on," also switches "on" a first subtraction trigger 615 (Figure 2) through a gate 612, controlled by the trigger 602, and inverter 614 and a further gate 613. The gate 613 is held open during the division by the major cycle counter, in a manner to be explained.

The trigger 615 drives, through a cathode follower, an inverter 631, to produce a positive output voltage. The output of the inverter 631 is connected to a cathode follower feeding control line M5 and also to the output of an inverter 619. The input to the inverter 619 is from a line 617, which is connected to a stage of the primary timer so that the line is negative only during the time of each T2 pulse. Consequently, during this time, the line M5 is positive, if the trigger 615 is also "on." The two inverters 619 and 631 also drive an inverter 620, which controls the voltage of the line M7. Hence, when the line M5 is positive, the line M7 is negative, the inverter 620 overriding the effect of the inverters 628.

For the T2 pulse, gates 71 (Figure 1) will be open and gates 15 will be closed, under control of the lines M5 and M7. A shift pulse is applied to the store 1 since the line M2 holds open the gate 12. Thus the first dividend digit, in the last stage of the store 1, is fed on to highway 30 and is not fed back to the input of the store.

When the trigger 615 is "on," it opens a gate 616, via a cathode follower 622. The gate 616 also receives TX pulses on a line 129, so that, at this time in the first minor cycle of a major cycle, the gate provides an output pulse to switch "on" a divide subtract trigger 625. When this trigger is "on" it makes the following control lines positive, D6, P1, P3, P5, A7 and A10, through cathode followers 626, 627, 656 and 654.

For the store 2, holding the divisor, gates 35, 28 and 23 will be open, allowing the divisor value to be read out via the gates 24 on to the highway 31, and also to be circulated in the store. Control lines D2 and D7 are held positive, through a cathode follower 623, by the divide trigger 610.

For the store 3, gates 49, 56 and 59 are held open by the lines P5, P1 and P3 respectively. This allows the remainder, which is zero on the first cycle, to be read on to the highway 30 and the output of the adding unit 29 to be entered into the store 3. Control line A4 is normally positive, allowing read out pulses to be fed by gate 47 to gates 46, to effect readout from the adding unit.

The line A7 controls the complementing circuit 42 to read the complement of the value on highway 31 to the adding unit. The line A10 controls addition of one to the least significant digit to ensure the correct complemental subtraction. Thus on the first minor cycle, the divisor is subtracted from the remainder, plus the first dividend digit, and the new remainder is entered into the store 3.

At the end of the first minor cycle, a T15 pulse is fed via the line 257, and a gate 621, which is controlled by the cathode follower 622, to the first subtraction trigger 615 to switch it "off."

On each minor cycle, a TX pulse is applied to a gate 632 (Figure 2), which is open if the remainder is negative. The output from this gate is fed to a gate 634 which is held open by the cathode follower 656 when the divide subtract trigger 625 is "on." This gate drives a further gate 635, which is open when the trigger 615 is "off." The output of the gate 635 is fed to the trigger 625 to switch it "off." Thus when the remainder goes negative, the gates of the store 3 are closed, together with the gates 35 of the store 2. This prevents reading out of the remainder and the divisor to the adding unit, so that no further subtractions take place in that major cycle.

The triggers for the "1" and "8" components of the highest digit position of the store 3 (Figure 1) control two inverters 701 and 702. If this digit is nine, the outputs from both the inverters are positive. This positive voltage is fed to the gate 632 by a cathode follower 703, and a line 599. As is usual when sensing the occurrence of a complementary value, the maximum positive value which can be registered is one digit less than the capacity of the store 3, so that the highest digit is zero for a positive value and nine for a negative value.

The number of minor cycles in each major cycle is counted by four cascaded triggers 636, 637, 638 and 639 (Figure 2). The first trigger 636 is connected to the second trigger 637 through a gate 641. The coupling between the triggers 637 and 638, and 638 and 639 is through inverters 640.

T15 pulses are applied to the counter by the line 257 and two gates 624 and 630 in cascade. The gate 624 is held open by the divide trigger 610 when it is "on," and the gate 630 is held open by the first subtraction trigger 615 when it is "off." The trigger 615 is "on" for the first minor cycle, so that no pulse is fed to the counter during this cycle. This is necessary because the counter also controls read out of the quotient digit, which is one less than the number of minor cycles which have occurred, since the divisor is subtracted one time too many.

The second, third etc., minor cycles are counted in normal binary fashion until the counter registers nine, that is, at the end of ten minor cycles. The triggers 636 and 639 are now "on," and the other two counting triggers are "off." The trigger 639 controls the gate 641 through a cathode follower 642 and an inverter 643. The cathode follower 642 also controls a gate 653, which receives a pulse when the first trigger 636 switches "off." The output of the gate 653 is fed to the trigger 639 to switch it "off." With the trigger 639 "on," the gate 641 is closed and the gate 653 is open.

At the end of the eleventh minor cycle, a T15 pulse switches the trigger 636 "off." The resultant output pulse is prevented from reaching the trigger 637 by the gate 641, but it is fed to the trigger 639 by the gate 653, thus resetting the count to zero.

The cathode follower 642 also controls a gate 651 which receives a pulse every time the trigger 636 switches "on." At the end of the ninth cycle, the trigger 639 is switched "on," thus opening the gate 651. At the end of the tenth cycle, the trigger 636 is switched "on," so that the gate 651 produces an output pulse which is used to switch "on" a divide add trigger 652. This trigger sets the voltage on the control lines so that the divisor is added to the remainder, and the remainder and the dividend are column shifted.

Through a cathode follower 655 and cathode followers 627, the trigger 652 makes the control lines D6, P1 and P5 positive. With the lines A7 and A10 held negative by the trigger 625, the complementing circuit 42 is conditioned for addition, so that the divisor is added to the remainder.

Through a further pair of cathode followers, the trigger 652 makes the control line P2 positive. This opens the gate 52 (Figure 1) to allow fourteen shift pulses to be applied to the store 3. As explained in the reference patent, the adding unit produces a delay of one pulse, so that fifteen pulses are required to shift a value through the adding unit and re-enter it in the original position in the store 3. By applying one pulse less than this the sum of the divisor and the remainder is re-entered in the store with a column shift of one position to the left.

The trigger 652 also controls a gate 600 (Figure 2) to allow a T9 pulse on a line 601 to be fed to the trigger 258 to switch it "off." Thus on this minor cycle, only eight pulses are produced on the line 9C, which results in a column shift of one position to the left of the value in the store 1, in the same way as for the store 3. This leaves the next highest dividend digit in the extreme right hand position of the store 1.

When the remainder goes negative, the appropriate quotient digit has to be read into the store 1. This is controlled by the minor cycle counter. At the beginning of the next cycle after that in which the remainder goes negative, the gate 634 produces a TX pulse. This pulse is fed, via a gate 644, to a quotient trigger 645, to switch it "on." The trigger 645 controls a gate 646, to which is applied a T2 pulse on line 218. If the remainder is negative at the end of the fourth minor cycle, for example, then the T2 pulse of the fifth cycle is passed by the gate 646 to an inverter 648. The output pulse from the inverter 648 is applied to four gates 649. The pulse from the gate 646 also switches "off" the trigger 645.

Each of the gates 649 is controlled by one of the four counting triggers 636 to 639. Since the first cycle is not registered by the counter, the triggers 636 and 637 will be "on" at the beginning of the fifth cycle and the T2 pulse will be passed by the two gates 649 which are controlled by these two triggers. The output pulses of the gates are fed to the input of the store 1 via lines 650

(Figures 1 and 2). A shift pulse is also applied to the store 1 at T2 time, so that the quotient digit three will be entered.

The eleven minor cycles complete the first major cycle, and it is necessary to switch "off" the divide add trigger 652 and to switch "on" the first subtraction trigger 615, to begin the second major cycle. This is effected by a gate 704 which is controlled by the trigger 652 and which passes a T15 pulse on the line 257 directly to the trigger 652, and via the inverter 614 and the gate 613 to the trigger 615. In this way, a sequence of major cycles will occur, to build up the quotient in the store 1.

The major cycle sequence is terminated by closing the gate 613 under control of a major cycle counter, to prevent the first subtraction trigger 615 being switched "on" at the end of a major cycle. This counter comprises four triggers 658, 659, 660 and 661 (Figure 3), which are connected in cascade by inverters 662 to form the usual type of binary counter. The last trigger 661 is coupled to a trigger 666 by a further inverter 662.

Figure 3:
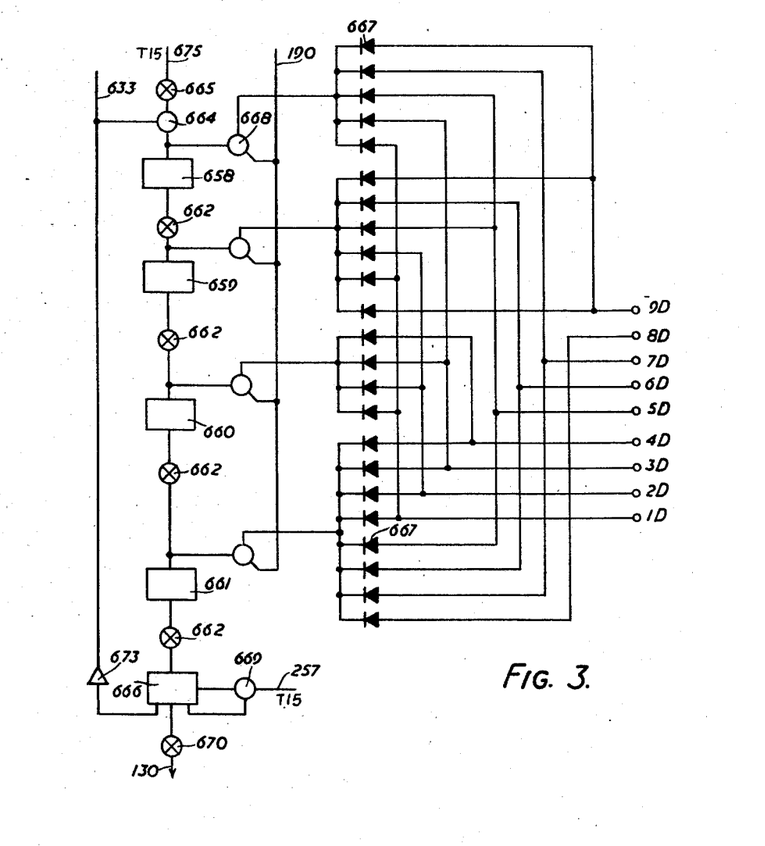
Figure 3 is a block diagram of the major cycle counter.

The number of major cycles, from one to nine, which is required is set by connecting the corresponding one of a group of plug sockets 1D to 9D to a positive voltage. This voltage is normally derived from a plug socket of the programme step on which division is taking place. Each of the plug sockets 1D to 9D is connected through isolating diodes 667 to a combination of four gates 663. Each of the gates is associated with one of the counting triggers and they all receive a pulse via the line 190 at the start of the division operation.

If, for example, five major cycles are required, then the gates 668 which are associated with the triggers 658, 659 and 661 will receive a positive control voltage from the socket 5D. When the pulse occurs on the line 190, these three gates will pass the pulse to switch "on" their associated triggers. Thus at the start of division the major cycle counter is set to register a count of eleven. The entry of five pulses on to the first trigger 658 will provide a carry from the last trigger 661, which is effective to switch "on" the trigger 666, so indicating that the five major cycles have been completed.

The input pulses for the major cycle counter are derived from the input pulses to the divide add trigger 652 a line 675 (Figures 2 and 3) through an inverter 663 and a gate 664. The trigger 666 controls both the gate 664 and the gate 613 (Figure 2), via a cathode follower 673 and line 633. Both these gates are open when the trigger 666 is "off." Thus a T15 timed pulse is fed to the trigger 658 of the counter at the end of the tenth minor cycle of each major cycle, up to and including the fifth cycle. During the last minor cycle, the trigger 666 is "on," so that the T15 pulse from the gate 704 is not fed to the first subtraction trigger 615.

The trigger 666 is switched "off" by a T15 pulse at the end of the last major cycle. This pulse is fed to the trigger by a gate 669, which is controlled by the trigger itself. In switching "off," the trigger 666 produces a pulse which is fed to line 130 by an inverter 670. This pulse on the line 130 is passed by a gate 674 (Figure 2) to switch "off" the divide trigger 610 and it also operates the operation complete trigger (not shown), to indicate that the next operation may commence.

It is not known in advance how many times the divisor must be subtracted on each major cycle, so that it is convenient to operate on a fixed basis of eleven minor cycles for each major cycle. If the maximum speed is desired, the circuit may be modified to provide for the minimum number of minor cycles in each major cycle.

The gate 651 is removed and the divide add trigger is switched "on" by the output of an inverter (not shown) which receives a pulse when the divide subtract trigger 625 switches "off." The addition and shift cycle will therefore occur immediately after the cycle in which the difference becomes negative.

The gates 641 and 653 and the inverter 643 are re-moved, and all stages of the counter are forcibly reset to zero by the output pulse, from the gate 704.

The input pulses to the major cycle counter now occur at TX time, so that there is one extra minor cycle at the end of the division operation before the trigger 666 is reset.

Figure 4:
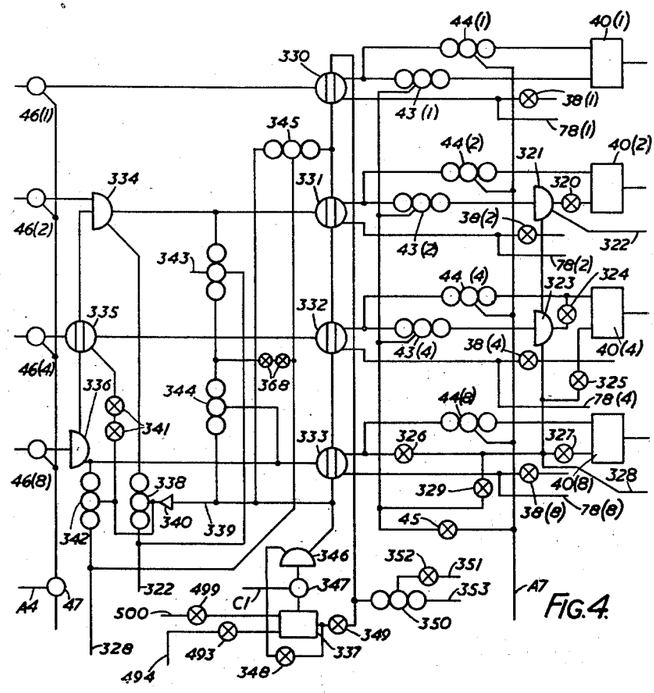
Figure 4 is a block diagram of the adder and complementer of Figure 1.

The adder 29 and complementer 42 of Figure 1 are shown in greater detail in Figure 4. A set of multiple gates 44(1), 44(2), 44(4) and 44(8) are controlled over line A7 so that when the potential on line A7 is negative the gates 44 are open and a digit represented by the settings of four triggers 40(1), 40(2), 40(4) and 40(8) is applied directly to the adding unit 29 (Figure 1). In order to perform subtraction the complement of a digit represented by the setting of triggers 40 is applied to the adding unit 29. Since the digits are coded effectively in a scale of sixteen, the complement to ten is not obtained directly by reading the inverse of the code components and additionally, complements to other scales are required for sterling calculations.

The method of forming the complement is based on the fact that if the code components of a digit are inverted, that is a "zero" is changed to a "one" and vice versa, the resulting digit is the complement to fifteen of the original digits. However, the complement is required to nine for a decimal digit or eleven for a pence digit. The correct complement is obtained by adding the base of the scale of notation to the complement of the digit to fifteen and ignoring any carry which may occur. For example, the complement of seven to fifteen is eight and the addition of ten gives the complement to nine as two, with a non-significant carry. In fact, the "filler digit," that is, the difference between sixteen and the scale of notation, is fed to the complement circuit and the circuit itself converts this to the equivalent of adding ten for decimal, twelve for duo-decimal, etc.

When the line A7 is positive, the gates 44 are closed and gates 43(1), 43(2) and 43(4) are opened. The input to the gate 43(1) is taken from the high anode of the trigger 40(1). Hence the output from the gate 43(1) will be a "zero" for a "one" setting and vice versa.

Figure 5:
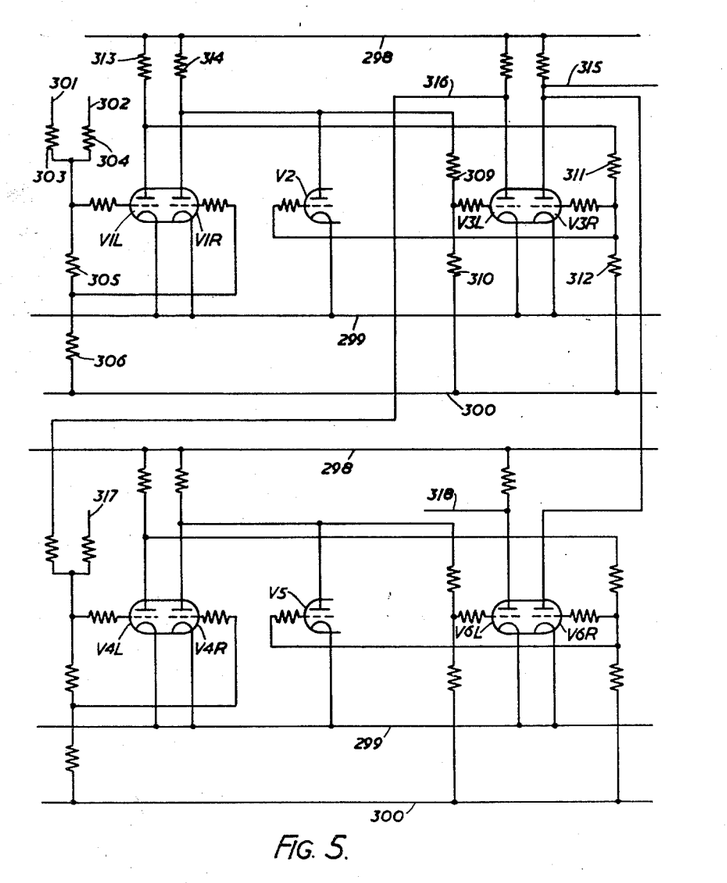
Figures 5 to 8 show details of circuit elements indicated schematically in Figures 1 to 4.

The high anode of the trigger 40(2) drives an inverter 320 which feeds a two input adder 321 indicated in block form by a semicircle in Figure 4 and described in detail in Figure 5. The sum output from the adder is connected directly to the gate 43(2), and the carry output is inverted and fed to a further two input adder 323. The other input to the adder 321 is from a line 322 which is negative except for a duodecimal denomination i.e. when triggers 40 are registered a pence value in a sterling computation. Since the sum output of adder 321 is not inverted, the output from the gate 43(2) will be as follows:

(1) Sum digit "one" for both inputs "zero."
(2) Sum digit "zero" for one input "zero" and one input "one."
(3) Sum digit "one" for both digits "one."

For condition (3), there will also be a carry of "one" fed to the adder 323.

The second input to the adder 323 comes from the low anode of the trigger 40(4), through an inverter 324. Thus, if the trigger 40(4) is registering "zero," the adder 323 will receive an input of "one," which is equivalent to adding four to the entered digit. The high anode of the trigger 40(4) drives an inverter 325. The output from this inverter, which will be negative for a "zero" setting of the trigger and positive for a "one" setting, is fed to a further inverter 326. The output from the inverter 326 drives the "8" value input line of the adding unit 29. Thus a "one" setting of the trigger 40(4) is made equivalent to a corresponding setting of the trigger 40(8), so that four is added to the entered digit for either setting of the trigger 40(4).

The inverter 326 is driven from four other sources,

Firstly, it is connected to the high anode of the trigger 40(8) through an inverter 327. For the tens of shillings denominations, an additional filler digit of eight is required, and this is provided under control of a line 328, which is positive except when the tens of shillings are registered by the triggers 40.

The carry output from the adder 323 is inverted in the usual manner, and connected to the inverter 326. Finally, the output of the inverter 45 feeds an inverter 329, the output of which also drives the inverter 326.

The inverter 329 prevents a complementary read out on the "8" value line, when the complementing circuit is set for a true read out. Under these conditions, the output from the inverter is negative and this maintains the anode of the inverter 326 high, irrespective of the voltages on the other input lines. In other words, a negative voltage overrides the effect of a positive voltage from any other input line.

When the circuit is set for complementary read out, the high voltage from the inverter 329 may be overridden by a low voltage on any of the other input lines. The operation of the circuit is such that only one of the input lines to the inverter 326 can assume a low voltage for any particular set of conditions.

As an example, the operation of the circuit will be considered for complementing the decimal digit six. The trigger 40(1) and 40(8) will be registering "zero" and the triggers 40(2) and 40(4) will be registering "one." The gate 43(1) will give a "one" output, since it is driven from the high anode of the trigger 40(1).

The adder 321 receives a "one" input from the line 322, and also from the trigger 40(2), since the high anode of the trigger is connected to the adder through the inverter 320. This produces a carry output of "one," and also a sum output of "one," since there is no inverter for the sum output line.

The adder 323 receives a "one" input from the adder 321 and a "zero" input from the trigger 40(4). Consequently, there is a "zero" carry and a "zero" sum output, as this adder is also without a sum inverter.

The inverter 326 is fed with a low voltage from the trigger 40(4) and with a high voltage from the other driving sources. The low voltage overrides the high voltage, to produce a high voltage at the output of the inverter 326, representing zero.

Although the operation of the circuit has been described sequentially, the voltages representing the complement value of three will appear on the output lines almost as soon as the true value is set up on the triggers 40, since all the circuits are D.C. coupled. The speed of response is limited by finite rise time of the individual circuits due to stray capacities.

Since the four possible code components of a digit are fed to the adding unit in parallel there are four three input adders 330-333 in such unit. Adder 330 receives one input from the inverter 38(1) and a second from the gate 44(1) or the gate 43(1), depending upon whether the value is being entered in true or in complement form. The third input is controlled by a carry storage trigger 337, the setting of which is dependent upon the result of the previous digit addition. The inverters 38(1), 38(2), 38(4) and 38(8) invert the outputs of a group of four triggers 37 (Figure 1) the settings of which represent a digit applied to the adding unit 29 over highway 30 in the same manner as triggers 40.

The adders 331, 332 and 333 are similarly connected except that the third input is provided by the carry output of the adder dealing with the next lower code component. As already described, the complement output from the "8" value code component is provided by the inverter 326.

Since the individual adders operate in binary, the output from the four adders is in a scale of sixteen, that is, the sum of six and six is formed as twelve, not as a sum result of two and a carry, if the entry is in decimal. The necessary correction is effected by two input adders 334 and 336, and a three input adder 335. The occurrence of a result inconsistent with the scale of notation is detected, and controls the setting of the carry storage trigger and the addition of an appropriate "filler digit." The occurrence of a carry from the adder 333 will also cause addition of a "filler digit."

Since there is no correction to the "1" code component, the output from the adder 330 controls the gate 46(1) directly. This gate requires a positive voltage to operate, so that the inverter on the sum output is omitted.

The sum output from the adder 331 is fed to the adder 334, which may also receive a "filler digit" of two from a gate 338. The gate 338 is controlled by the line 322, which controls addition of two in the complementing circuit, and by a carry line 339, through a cathode follower 340. If the lines 322 and 339 are both negative, indicating that the digit being added is not in the duodecimal scale and that a carry has occurred, the output from the gate 338 will be negative. This causes the addition of the "filler digit" to the sum output of the adder 331. The sum output of th eadder 334 controls the gate 46(2), and the carry output is fed to the adder 335.

The adder 335 also receives the sum output from the adder 332, and a "filler digit" of four if the line 339 is negative. The line 339 controls the adder 335, through the cathode follower 340 and two inverters 341 in cascade. The sum output of the adder 335 controls the gate 46(4); the carry output is fed to the adder 336.

The sum output from the adder 333 is fed to the adder 336. A "filler digit" of eight is required only for the scale of two, when the output from the adder 333 can only be "zero." Accordingly, the output of a gate 342, which is controlled by the line 328 and by the cathode follower 340, is commoned with the output of the adder 333. The sum output of the adder 336 controls the gate 46(8). The carry output is not used, since any carry out of the denomination is generated by the adder 333, if the sum of the input digits is greater than fifteen, or by the circuits controlling the addition of the "filler digit."

The sum outputs of the adders 334, 335 and 336 control their respective gates without the use of an inverter, as in the case of the adder 330.

The occurrence of an "8" code component with a "4" and/or a "2," in the sum output of the four main adders, is detected by two gates 343 and 344. The gate 343 is controlled by the sum output of the adder 331 and the line 322. The output will be negative if there is a "2" in the sum and a "filler digit" of two. This output is fed to the gate 344, in common with the sum output from the adder 332 through two inverters 368. The gate 344 is also controlled by the output from the adder 333. The output from this gate which is connected to the carry line 339, will be negative if there is an "8" in the sum output and the gate 343 is providing a negative output, or there is a "4" in the sum output. If the line 322 is positive for a duodecimal denomination, it prevents a "2" in the sum from causing a carry.

The occurrence of a "2" code component requires the addition of a "filler digit" of "8," when adding in the tens of shillings denomination. A gate 345 is controlled jointly by the carry output from the adder 330 and by the line 328. Hence the output of the gate, which is connected to the line 339, will be negative if a carry occurs and the line 328 is negative.

The carry line 339 is connected to a two input adder 346 which controls setting of the carry storage trigger 337. The other input to the adder comes from the high anode of the trigger 337, through an inverter 348. The sum output of the adder controls a gate 347, without the use of an inverter, which gate also receives clock pulses on the line C1. The output from the gate is fed to the grids of the carry storage trigger.

The adder 346 will produce a positive output if the two inputs are different, that is if the setting of the carry trigger does not agree with the state of the carry line 339. This will allow the gate 347 to feed a clock pulse to the trigger to set it to agree with the carry line. The high anode of the trigger 337 is also connected to one input of the adder 330, through an inverter 349. Since the read out gates 46 are controlled by the same clock pulses which effect setting of the trigger 337, each setting of the trigger is effective for carry entry in the addition of the denomination next after that which produced the setting.

When adding in complement, it is necessary to convert the least significant digit of the number to a complement to ten, in the case of decimal, or to twelve or two for duodecimal or binary respectively. This is effected by a gate 350, the output of which is commoned with that of the inverter 349. The socket CB controls the gate 350, through a cathode follower 163, line 351 and inverter 352, the output of which will be negative when the complementing circuit is operative. The other input to the gate is via a line 353, which is negative only during the addition of the least significant digit so that during this period both inputs to gate 350 are negative and the output is negative, to enter a "one" in the adder 330. Since the least significant digit is being added, trigger 337 cannot be registering a carry.

Figure 5 shows circuit details of a binary adder such as is used in the adding unit 29.

Two inputs are applied to the adder on lines 301 and 302. The input convention adopted is that for a zero (no code component), the input line is positive and that for a one (code component present), the input line is negative. The terms positive and negative are used in the same sense as in the case of a control voltage. The two input lines 301 and 302 are connected, through resistors 303 and 304, to resistors 305, and 306 in series, to a negative bias line 300.

The grid of a triode V1L is connected to the junction of the resistors 303 and 304, and the resistor 305, and the grid of a triode V1R is connected to the junction of the resistors 305 and 306.

When the two inputs are zero, both the lines 301 and 302 are positive, and the grids of V1L and V1R are held above cut-off. These two valves draw current through anode resistors 313 and 314 respectively, so that their anodes are low.

The anode of V1R is connected through resistors 309 and 310 to the bias line 300. With V1R conducting, an inverter triode V3L, the grid of which is connected to the junction of the resistors 309 and 310, is held nonconducting. The anode of V3L is therefore at the voltage of positive supply line 298. The voltage of a line 316, connected to the anode of V3L indicates the sum digit, which is zero, since the voltage is high.

In a similar way, the anode voltage of V1L controls conduction in a triode V3R, the grid of which is connected to the junction of resistors 311 and 312, which are connected between the anode of V1L and the line 300. Since V1L is conducting a line 315 connected to the anode of V3R will be indicating a carry digit of zero.

If the input is one and zero, one of the lines 301 and 302 will be positive and the other will be negative. The grid of V1L is still held above cut-off, so that the line 315 will still indicate a carry digit of zero. However, the grid of V1R will fall below cut-off. The increase in anode voltage of V1R allows V3L to conduct, and the line 316 becomes negative to indicate a sum digit of one.

If the input is one and one, both the lines 301 and 302 will be negative and both V1L and V1R will be cut-off. The high anode voltage of V1L allows V3R to conduct and the line 315 falls negative to indicate a carry digit of one.

The grid of a triode V2 is connected to the junction of resistors 311 and 312 so that V2 is conducting when V1L is non-conducting and vice versa. The anode of V2 is connected to the anode of V1R, so that when V1L is non-conducting, V3L is also held non-conducting, due to conduction in V2. Thus the line 316 remains positive, indicating a sum digit of zero.

It will be appreciated that the valve V3L and V3R function solely as inverters; the sum and carry digits are available at the anodes of V1R and V1L respectively, but the digit convention is reversed. The inverters enable two or more two-input adders to be coupled in cascade.

The usual requirement is for a three input adder, to deal with the sum of two components and a carry from a previous adder. This is met by connecting the sum line 316 to form one input of a second two-input adder. The carry from a preceding stage is connected to a line 317, which is the second input line. These two inputs control valves V4L and V4R to form sum and carry representing voltages, which are inverted by valves V6L and V6R. A line 318 connected to the anode of V5L assumes a voltage representing the sum of the three inputs. The anode of V6R is connected to the anode of V3R, since, at most, only one of these two valves can be conductive for any combination of three inputs. Hence, the line 315 assumes a voltage representing the carry digit derived from the three inputs.

Figure 6:
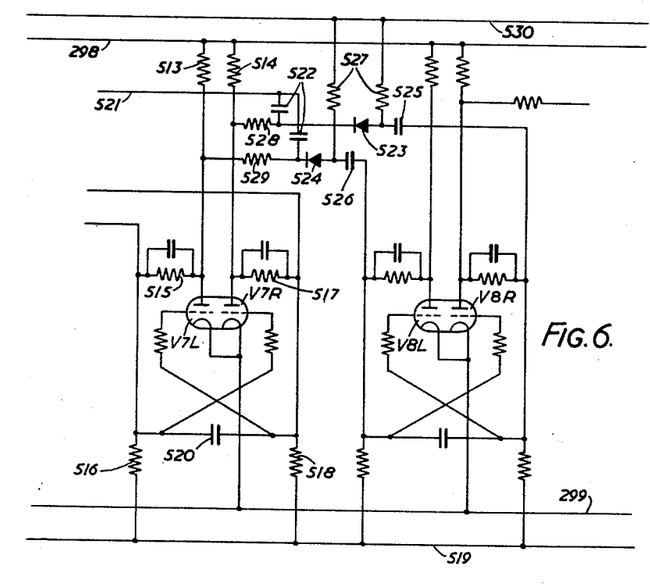

Figure 6 shows circuit details of two stages of a shifting register such as is used in the stores 1, 2 and 3. As previously mentioned each of these stores comprises a shifting register for each of the code elements 1, 2, 4 and 8 the individual registers being indicated in Figure 1 by the references 1(1), 1(2), 1(4) and 1(8) for store 1 and similarly for the other stores.

Each stage of the shifting register used comprises a trigger circuit, such as V7L, V7R, together with a shifting circuit coupling it to the next higher circuit in the chain.

The anodes of V7L and V7R are connected to the +160 volt supply line 298, through resistors 513 and 514, respectively. The anode of V7L is connected, through resistors 515 and 516, to a −93 volt supply line 519. Similarly, the anode of V7R is connected to the line 519, through resistors 517 and 518. The cathodes of V7L and V7R are connected to ground line 299.

The grid of V7L is connected to the junction of resistors 517 and 518, and the grid of V7R is connected to the junction of resistors 515 and 516. When V7L is conducting, the grid of V7R is held at −26 volts, which is more than sufficient to cut it off. The grid of V7L is held at approximately +1 volt. The anode voltages of V7L and V7R are +35 volts and +125 volts under these conditions.

The trigger is switched to the other condition of stability by applying a negative pulse to the conducting grid. The switching characteristics are improved by the connection of a capacitor 520 between the two grids.

Negative shifting pulses of approximately 75 volts amplitude are applied to two diodes 523 and 524, through capacitor 522. The cathodes of the diodes 523 and 524 are connected to the anodes of V7L and V7R, through resistors 528 and 529. The anodes of the diodes are connected to a +50 volt supply line 530, through resistors 527, and to the grids of a succeeding trigger V8L, V8R, through capacitors 525 and 526.

With V7L conducting, the diode 523 has a reverse voltage across it of 75 volts, since the anode of V7R is at +125 volts. The diode 524 is conducting. When a negative shifting pulse is applied, the anode voltage of the diode 524 falls, transmitting a negative pulse to the grid of V8R. If this valve is already cut off, the pulse has no effect; if it is not cut off, then the pulse switches the trigger and leaves it in the same state as V7L, V7R had before the shifting pulse was applied.

The shifting pulse makes the voltage across the diode 523 approximately zero. Thus only a small pulse, or none at all, is fed to the grid of V8L.

The triggers used for control, carry storage etc., are similar to those used in the registers. Operating pulses are capacitatively coupled to the grids of the valves.

Figure 7:
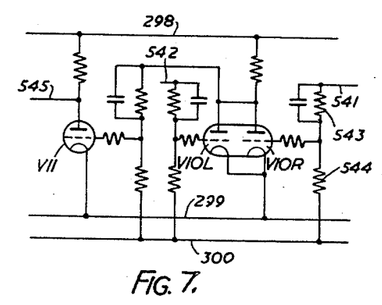

Figure 7 shows circuit details of a simple gate such as is used in groups of four to control the circulation of information in the arithmetic unit of Figure 1 and as is used in the control arrangements of Figs. 2 and 3.

Each such gate comprises a single triode V9 to the grid of which the control voltage is applied through resistors 536 and 533. The junction of the resistors is connected to a −20 volt supply line 535 through a diode 534. The control voltage is −10 volts or −70 volts, for the relatively positive and negative conditions.

Because of the diode, the grid of V9 is held at either −18 volts or −70 volts. In either case it is cut off.

If a positive pulse of 20 volts amplitude is fed to the grid through a capacitor 532, the valve will conduct —if the control line is at −10 volts, but not if it is at −70 volts. A pulse transformer 537 in the anode circuit provides a positive pulse on a line 539 when V9 conducts. A diode 538, across the primary winding of the transformer, damps out any overshoot. A diode 540, across the secondary winding, limits the amplitude of the output pulse to 20 volts.

Where a negative output pulse is required, the transformer is replaced by an anode resistor.

Figure 8:
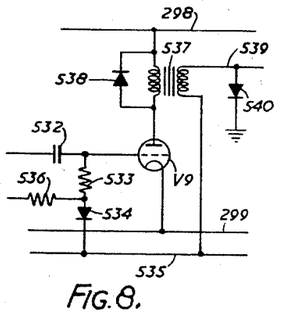

Figure 8 shows circuit details of a multiple gate such as is used in the adder unit and complementer unit of Figure 4 e.g. gates 43 and 44.

The gate consists of three inverters V10L, V10R and V11. One control voltage, on a line 541, is fed to the grid of V10R, through a resistor 543. The grid is also connected to the −310 volt supply line 300, through a resistor 544. The grid is either at +2 volts or −45 volts, depending upon whether the control line is positive or negative.

The other control voltage, on a line 542, is fed to the grid of V10L, by a similar input circuit. V10L and V10R have a common anode load resistor, so that the anode voltage rises appreciably only when both the valves are cut off. This anode voltage is fed to the grid of V11, and the voltage of a line 545, connected to the anode of V11, will drop only when V10L and V10R are both cut off.

The valve V11 is a typical D.C. inverter circuit, corresponding to the inverters 38 and 45 (Figure 1), for example. For pulse inversion, the input potentiometer is connected between the lines 298 and 299. The shunting capacitor is removed, and the pulse input is capacitatively coupled to the grid.

What is claimed is:

1. Cyclically operable electronic digital calculating apparatus for performing division operations on divisor and dividend values represented by signal groups of parallel signals, each said group corresponding to one denomination of one of said values and said groups occurring serially, comprising means for storing signals representing divisor, dividend, quotient and difference values, subtraction means for subtractively combining signals representing a minuend value and signals representing a subtrahend value to produce signals representing a difference value, said subtraction means being also conditionable additively to combine signals applied thereto, control means for controlling said apparatus to perform a predetermined number of subtraction operations followed by an addition operation in each cycle of operation, first read-out means for reading out signals representing said divisor value and for applying such signals to said subtraction means as said subtrahend value, second read-out means for reading out, in the first subtraction operation of each cycle of operation, signals representing, in successive cycles, the most significant digit of said dividend value which has not previously been read out and for applying such signals to said subtraction means as said minuend value, whereby said subtraction means produces signals representing the difference between the values represented by the signals applied thereto, means for entering said signals representing said difference into said difference storage means, third readout means for reading out signals stored in said difference storage means and for applying such signals as said minuend value in the second subtraction operation of the first cycle of operation and in all subsequent subtraction operations whereby in each cycle of operation said divisor value is repeatedly subtracted from a digit of said dividend value, counting means operative in each cycle of operation to count each effective subtraction operation except the first, means for detecting the entry of signals representing a negative difference value in said difference storage means and operative upon such detection to render ineffective further subtraction operations during the current cycle of operation, and means for entering the count registered by said counting means at the end of each cycle of operation into said quotient storage means, said control means being operative in the addition operation of each cycle of operation to control readout and application to said subtraction means of signals representing said divisor value and said negative difference value and to condition said subtraction means additively to combine the signals applied thereto whereby to effect an add back operation and to enter signals representing a lowest positive difference value in said difference storage means.

2. Apparatus as claimed in claim 1 including further counting means operative to count said predetermined number of subtraction operations and to deliver an output signal, upon registering said predetermined number, to said control means to initiate said addition operation.

3. Apparatus as claimed in claim 1 including further counting means operative to count said predetermined number of subtraction operations and said addition operation and to deliver a first output signal upon registering said predetermined number, to said control means to initiate said addition operation, and operative to deliver a second output signal, upon additionally counting said addition operation, to said control means to initiate a further cycle of operation of the apparatus.

4. Apparatus as claimed in claim 1 in which each said storage means is constituted by one shifting register for each signal of a signal group, and means for applying shift pulses to the shifting register and in which there is provided manually settable means for controlling the number of shift pulses applied to the shifting registers constituting said dividend storage means in a preliminary cycle prior to said cycles of operation.

5. Apparatus as claimed in claim 4 including division control means operative to permit control of said shift pulses by said manually settable means during said preliminary cycle and to prevent control by said manually settable means during subsequent cycles of subtraction operations.

6. Apparatus as claimed in claim 1 in which each said storage means is constituted by one shifting register for each signal of a signal group and means for applying shift pulses to the shifting registers, and in which said control means is operative, during an addition operation, to modify the number of shift pulses applied to said dividend, quotient and difference storage means whereby to effect column shift of the values represented by the signals stored therein.

7. Cyclically operable electronic digital calculating apparatus for performing division operations on divisor and dividend values represented by signal groups each corresponding to one denomination of one of said values, said groups occurring serially, said apparatus comprising means for combining, repeatedly and subtractively, in each of a succession of major cycles, signals representing a minuend value and signals representing a subtrahend value to produce signals representing a final lowest positive difference value, each major cycle including a number of minor cycles, the said combining means including means for examining the sign of an intermediate difference value represented by signals produced by the said combining means after each minor cycle, the examining means being actuated only when the sign is negative, means for suppressing the repeated subtractive combination in response to actuation of the examining means at the end of a minor cycle and means operable during a further final minor cycle of each major cycle in response to actuation of the said examining means to additively combine the said signals representing the intermediate difference value and the subtrahend value to produce signals representing an intermediate lowest positive difference value, means for applying signals representing said divisor as a subtrahend value to said combining means, means for applying to said combining means, in the first minor cycle of the first of the succession of major cycles of operation of said apparatus, signals representing the most significant digit of said dividend value as said minuend value and, in the first minor cycle of each subsequent major cycle, signals representing a next most significant digit of said dividend value supplemented by said signals representing an intermediate lowest positive difference value produced in a next preceding major cycle as said minuend value, and means for counting the subtraction operations performed in each major cycle of operation to provide successive digits of a quotient value.

8. Cyclically operable electronic digital calculating apparatus for performing division operations on divisor and dividend values represented by signal groups of parallel signals, each group corresponding to one denomination of one of said values, the said groups occurring serially, said apparatus comprising means for storing signals representing divisor, dividend, quotient and difference values, means for combining repeatedly and subtractively, in a succession of major cycles, signals representing a minuend value and signals representing a subtrahend value to produce signals representing a final lowest positive difference value, each major cycle including a number of minor cycles, the said combining means including means for examining the sign of an intermediate difference value represented by signals produced by the said combining means, the examining means being actuated only when the sign is negative, means for suppressing the repeated subtractive combination in response to actuation of the examining means at the end of a minor cycle and means operable during a further final minor cycle of each major cycle in response to actuation of said examining means to additively combine the said signals representing the intermediate difference value and the subtrahend value to produce signals representing an intermediate lowest positive difference value, means for reading out signals representing said divisor value and for applying such signals as said subtrahend value to said combining means, means operative, in a first minor cycle of the succession of major cycles of operation of said apparatus, to read out signals representing the most significant digit of said dividend value and to apply such signals as said minuend value to said combining means, and operative in the first minor cycle of each subsequent major cycle of operation, to read out signals representing a next most significant digit of said dividend value and to apply such signals in combination with signals representing said intermedate lowest postive difference value produced in a next preceding major cycle as said minuend value to said combining means, means for counting all but one of the subtraction operations performed in each major cycle of operation, and means for entering the count registered by said counting means, as a digit of the quotient, in said quotient storage means at the end of such major cycle of operation.

References Cited in the file of this patent
UNITED STATES PATENTS

| 2,327,981 | Friden | Aug. 31, 1943 |
| 2,623,171 | Woods-Hill | Dec. 23, 1952 |
| 2,624,508 | Dickenson | Jan. 6, 1953 |
| 2,636,672 | Hamilton | Apr. 28, 1953 |
| 2,863,604 | Leclerc et al. | Dec. 9, 1958 |

OTHER REFERENCES

Synthesis of Electronic Computing and Control Circuits, by the Staff of the Computation Laboratory, Harvard University Press, 1951, pages 207 to 212 and 216 to 218.

Notice of Adverse Decision in Interference

In Interference No. 91,992 involving Patent No. 2,932,450, L. Knight and A. Trussell, Electronic calculating apparatus, final decision adverse to the patentees was rendered Apr. 29, 1963, as to claims 7 and 8.

[*Official Gazette August 20, 1963.*]